United States Patent [19]

Stokes

[11] Patent Number: 4,594,525
[45] Date of Patent: Jun. 10, 1986

[54] ROTATABLE ASSEMBLY FOR A DYNAMOELECTRIC MACHINE

[75] Inventor: Vijay K. Stokes, Schenectady, N.Y.

[73] Assignee: General Electric Company, Fort Wayne, Ind.

[21] Appl. No.: 625,608

[22] Filed: Jun. 28, 1984

Related U.S. Application Data

[63] Continuation-in-part of Ser. No. 507,878, Jun. 27, 1983, abandoned.

[51] Int. Cl.⁴ .............................................. H02K 1/28
[52] U.S. Cl. ..................................... 310/156; 310/42; 310/43
[58] Field of Search ................... 310/42, 156, DIG. 6, 310/68 B; 335/207

[56] References Cited

U.S. PATENT DOCUMENTS

| | | | |
|---|---|---|---|
| 2,091,190 | 8/1937 | Tognola | 310/156 |
| 3,140,414 | 7/1964 | Skjodt et al. | 310/235 |
| 3,492,519 | 1/1970 | Kirkwood et al. | 310/235 |
| 3,502,914 | 3/1970 | Cox | 310/42 |
| 3,553,512 | 1/1971 | Vettermann et al. | 310/174 |
| 3,914,629 | 10/1975 | Gardiner | 310/46 |
| 4,329,606 | 5/1982 | Montagu | 310/156 |
| 4,389,589 | 6/1983 | Schustek | 310/156 |
| 4,464,595 | 8/1984 | Hamano et al. | 310/42 |

FOREIGN PATENT DOCUMENTS

| | | | |
|---|---|---|---|
| 54-705 | 1/1979 | Japan | 310/156 |
| 395304 | 12/1965 | Switzerland | 310/156 |

Primary Examiner—Patrick R. Salce
Assistant Examiner—D. L. Rebsch
Attorney, Agent, or Firm—Joseph E. Papin

[57] ABSTRACT

A rotatable assembly for a dynamoelectric machine has a pair of sets of opposite tabs formed on a flux ring at least adjacent a pair of opposite end portions thereof, respectively, and a set of magnet material elements is disposed in assembly positions generally about an outer circumference of the flux ring. At least some of the opposite tabs are deformed into engagement with confronting parts of the magnet material elements in their assembly positions, and thereby at least in part, the magnet material elements are retained against displacement from their assembly positions.

27 Claims, 13 Drawing Figures

ROTATABLE ASSEMBLY FOR A DYNAMOELECTRIC MACHINE

CROSS-REFERENCE TO RELATED APPLICATION

This application is a continuation-in-part of the commonly assigned application Ser. No. 507,878 filed June 27, 1983 (now abandoned) which is incorporated by reference herein.

FIELD OF THE INVENTION

This invention relates in general to electrical apparatus and in particular to an improved rotatable assembly for a dynamoelectric machine.

BACKGROUND OF THE INVENTION

In the past, various different schemes have been employed to retain magnet material elements, such as permanent magnets or the like for instance, against displacement from assembly positions thereof on a rotatable assembly for a dynamoelectric machine. One such scheme is shown in U.S. Pat. No. 4,327,302 issued Apr. 27, 1982 to Doran D. Hershberger. In this patent, a plurality of magnet material elements in the form of bars are abutted between adjacent pole pieces of a rotatable assembly for a dynamoelectric machine, and such magnet material elements are encapsulated in part by rotor bars cast between the adjacent pole pieces with the bars being integral with opposite end rings also cast on the rotatable assembly.

In other prior art patents, metal and metal alloy sleeves or bands were heat shrunk about a rotor core into displacement preventing engagement with a set of magnet material elements arranged or otherwise seated in assembly positions about the circumference of the rotor core, see for instance U.S. Pat. No. 4,242,610 and U.S. Pat. No. 3,531,670. One of the disadvantages or undesirable features with respect to the above discussed shrinking of metallic bands or sleeves about a rotor core to retain the magnet material elements thereon is believed to be that it was too expensive and too cumbersome in manufacture and resulted in rather hot undesirable work areas. Another disadvantageous or undesirable feature with respect to the above discussed metallic bands is believed to be that such metallic bands may increase rotor core losses due to eddy currents resulting in reduced motor efficiency. Further, it is also believed that such above discussed metallic bands, if formed of steel, may also create a short circuit of the magnetic flux resulting in reduced torque output per unit of current input of the motor.

In the U.S. Pat. No. 3,221,194, a rotor core with permanent magnet material elements arranged thereon was dipped into a plastic bath, and when cured, the plastic formed an encapsulating layer over both the rotor core and permanent magnet material elements securing them together. At least one of the disadvantageous features of this plastic encapsulation of the rotor core and permanent magnet material elements is believed to be that it might involve a rather messy procedure resulting in an undesirable work area.

SUMMARY OF THE INVENTION

Among the several objects of the present invention may be noted the provision of an improved rotatable assembly for a dynamoelectric machine which overcomes the above discussed disadvantageous and undesirable features, as well as others, of the prior art; the provision of such improved rotatable assembly in which a relatively light, generally annular cylindric flux ring is utilized as a means for distributing magnetic flux; the provision of such improved rotatable assembly in which a set of magnet material elements are retained against displacement from assembly positions about the flux ring by sets of tabs deformed therefrom into interlocking engagement with the magnet material elements; the provision of such improved rotatable assembly in which a matrix is provided in supporting relation between at least parts of the flux ring and a shaft therefor; the provision of such improved rotatable assembly in which at least a set of tabs deformed from the flux ring are embedded at least in part in the matrix; and the provision of such improved rotatable assembly having components which are simple in design, economical in manufacture and easily assembled. These as well as other objects of the present invention will be in part apparent and in part pointed out hereinafter.

In one form of the invention, a rotatable assembly for a dynamoelectric machine has a generally annular flux ring and a set of magnet material elements associated in assembly positions with the flux ring generally about the outer circumference thereof, respectively. The flux ring includes a set of opposite deformed means for gripping engagement with confronting opposite parts on the magnet material elements thereby to at least in part retain the magnet material elements against displacement from the assembly positions thereof, respectively.

BRIEF DESCRIPTION OF THE DRAWINGS

Corresponding reference characters refer to corresponding parts throughout the several views of the drawings.

The exemplifications set out herein illustrate the preferred embodiments of the invention in one form thereof, respectively, and such exemplifications are not to be construed as limiting either the scope of the disclosure or the scope of the invention in any manner.

DETAILED DESCRIPTION OF THE PREFERRED EMBODIMENTS

Figure 1:
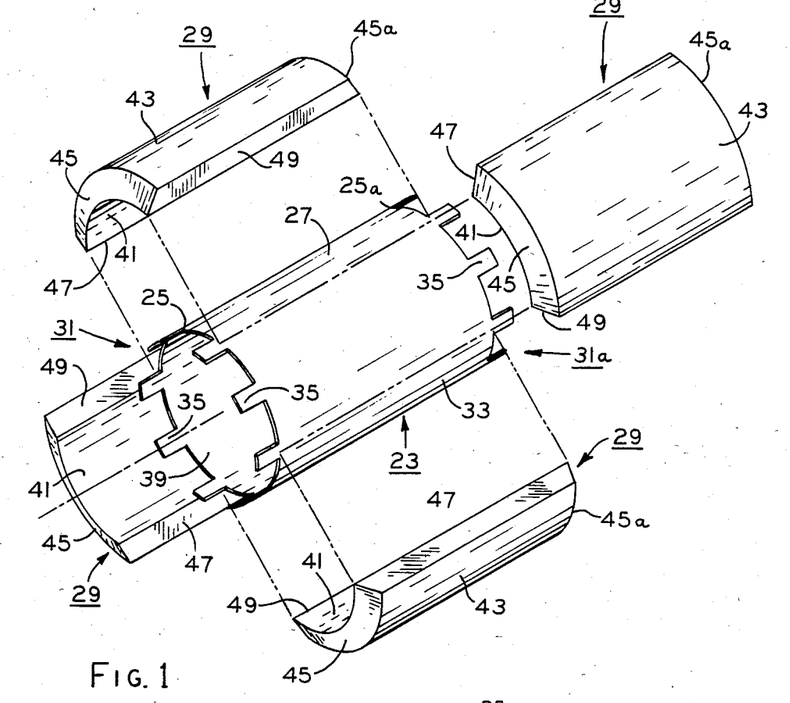
FIG. 1 is an exploded perspective view showing a rotatable assembly for a dynamoelectric machine in one form of the invention and illustrating principles which may be practiced in a method of assembling a rotatable assembly for a dynamoelectric machine.
Figure 2:
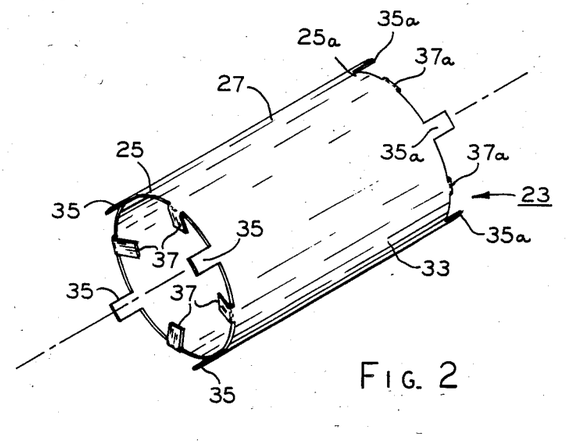
FIG. 2 is a perspective view showing a flux ring utilized in the rotatable assembly of FIG. 1 with a set of opposite anchoring tabs on a generally annular flux ring utilized in the rotatable assembly of FIG. 1 deformed generally inwardly of the flux ring with respect to the outer circumference thereof, respectively.
Figure 3:
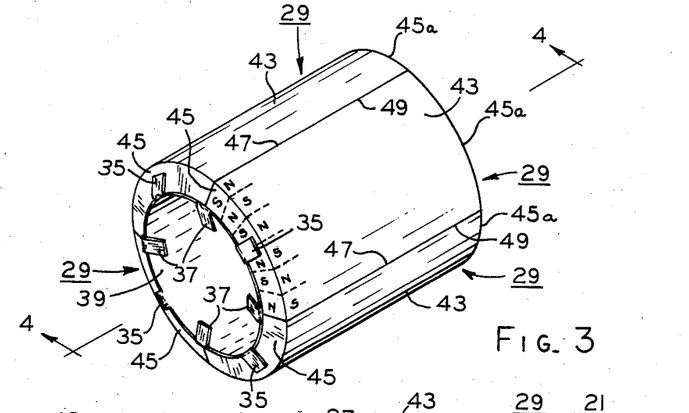
FIG. 3 is a perspective view showing the magnet material elements of FIG. 1 associated in assembly relation about the outer circumference of the flux ring with a set of opposite locking tabs of the flux ring deformed into displacement preventing engagement with the magnet material elements, respectively.
Figure 4:
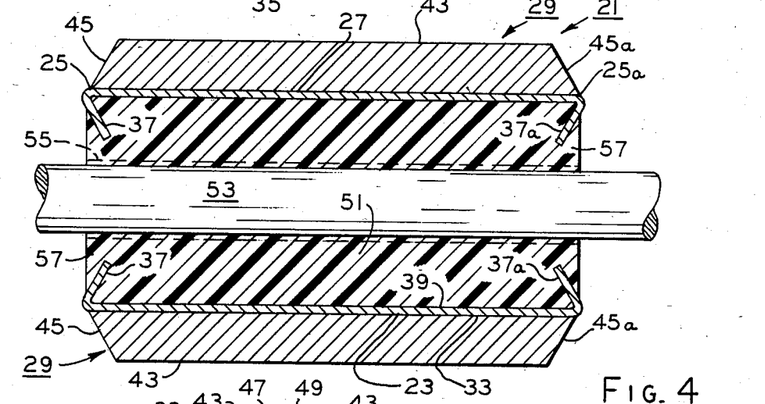
FIG. 4 is a sectional view taken along line 4—4 of FIG. 3 and additionally showing a matrix disposed in supporting relation between at least parts of the flux ring and a shaft arranged generally coaxially therewith.
Figure 5:
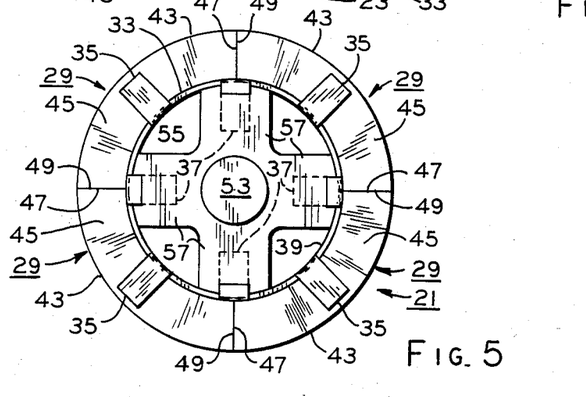
FIG. 5 is an end elevational view of the rotatable assembly taken from FIG. 4.

Referring now to the drawings in general, there is illustrated a method for assembling a rotatable assembly 21 for a dynamoelectric machine, such as for instance an electronically commutated motor or the like (not shown) (FIGS. 1-5). Rotatable assembly 21 includes a generally annular cylindric flux ring 23 having a pair of opposite end portions 25, 25a with an intermediate portion 27 interposed therebetween, respectively, and a set of generally arcuate magnet material elements 29 (FIG. 1). In practicing this method, a pair of sets of opposite tabs or flanges 31, 31a are formed on flux ring 23 at least generally adjacent opposite end portions 25, 25a thereof (FIGS. 1 and 2), and magnet material elements 29 are disposed or otherwise associated in assembly positions about an outer circumference or circumferential surface 33 of the flux ring, respectively (FIGS. 3 and 5). At least some of opposite tabs 31, 31a, such as opposite locking tabs or flanges 35, 35a, are deformed or otherwise displaced into engagement with confronting parts of magnet material element 29 in their assembly positions, and at least in part, the magnet material elements are retained against displacement from their assembly positions, (FIGS. 3 and 5).

More particularly and with specific reference to FIG. 1, flux ring 23 may be formed in any suitable manner into the generally annular cylindric configuration thereof from a generally thin strip of ferromagnetic material, such as steel, suitable for distribution of magnetic flux. Opposite tabs 31, 31a include opposite lockings 35, 35a and opposite anchoring tabs or flanges 37, 37a as discussed in greater detail hereinafter, and opposite tabs 31, 31a may be lanced from the flux ring or otherwise formed therefrom generally at opposite end portions 25, 25a of the flux ring, respectively. Of course, upon the formation of flux ring 23, a bore defined generally by an inner circumference or circumferential surface 39 of the flux ring is provided generally axially therethrough between opposite end portions 25, 25a of the flux ring. Although flux ring 23 is shown herein for purposes of diclosure, it is contemplated that various other flux rings of different constructions and/or different configurations may be employed within the scope of the invention so as to meet at least some of the objects thereof.

Magnet material elements 29 are provided with a generally arcuate inner surface 41 and a generally arcuate outer surface 43 interposed between a pair of opposite end portions or end faces 45, 45a, and a pair of generally opposite marginal edges 47, 49 on the magnet material elements intersect between both the arcuate inner and outer surfaces and the opposite end faces, thereby to define the arcuate lengths of the magnet material elements, respectively. Magnet material elements 29 may, if desired, be formed of a frangible ferrite ceramic material and are available from Crucible Magnetics Division of Colt Industries, Elizabethtown, Ky. However, while magnet material elements 29 are shown herein for purposes of disclosure, it is contemplated that various other magnet material elements having different configurations and formed of different material may be utilized within the scope of the invention so as to meet at least some of the objects.

Subsequent to the formation of flux ring 23, as previously discussed, arcuate inner surfaces 41 of magnet material elements 29 may be positioned or associated generally in facing relation with outer circumference 33 of flux ring 23, and the magnet material elements are then moved into the assembly positions thereof on the flux ring, as best seen in FIG. 3. Upon the movement of magnet material elements 29 into their assembly positions, arcuate inner surfaces 41 of the magnet material elements are disposed generally about intermediate portion 27 of flux ring 23, and opposite end faces 45, 45a on the magnet material elements are arranged or positioned at least generally adjacent opposite end portions 25, 25a of the flux ring, respectively. Thus, arcuate inner surfaces 41 of magnet material elements 29 are disposed generally about outer circumference 33 of flux ring 23 when the magnet material elements are in the assembly positions thereof. Although adjacent opposite marginal edges 47, 49 on magnet material elements 29 are illustrated generally in abutting relation with each other, as best seen in FIG. 3, it is contemplated that such adjacent opposite marginal edges may be arranged in spaced apart relation within the scope of the invention so as to meet at least some of the objects thereof. With magnet material elements 29 so associated in the assembly positions thereof about flux ring 23, forces may be applied or exerted on opposite locking tabs 35, 35a on the flux ring, to deform or bend them generally outwardly beyond outer circumference 33 of the flux ring into gripping or displacement preventing engagement with opposite confronting parts on opposite end faces 45, 45a of the magnet material elements so as to at least in part effect the retention of the magnet material elements against displacement from the assembly positions thereof, respectively. It may be noted that opposite end faces 45, 45a of magnet material elements 29 are beveled, and upon the deformation of the aforementioned opposite locking tabs 35, 35a into mechanical locking engagement with such beveled opposite end faces, such locking tabs generally define an acute angle with outer circumference 33 of flux ring 23, respectively. Thus, the forces exerted by deformed locking tabs 35, 35a of flux ring 23 are directed generally radially inwardly with respect to outer circumference 33 of the flux ring onto opposite end faces 45, 45a of magnet material elements 29 thereby to mechanically lock the magnet material elements to the flux ring. While only one of locking tabs 35, 35a is illustrated herein in the above discussed locking or abutting engagement thereof with opposite end faces 45, 45a of respective ones of magnet material elements 29, it is contemplated that a plurality of such locking tabs may be provided employed in locking engagement with the opposite end faces of the respective ones of the magnet material elements within the scope of the invention so as to meet at least some of the objects thereof. Furthermore, although opposite locking tabs 35, 35a of flux ring 23 and opposite end faces 45, 45a of magnet material elements 29 are shown herein for purposes of disclosure, it is also contemplated that other tabs and other end faces having different shapes as well as engagements therebetween may be employed within the scope of the invention so as to meet at least some of the objects thereof.

Either before, after or generally simultaneously with the deformation of opposite locking tabs 35, 35a on flux ring 23, as discussed above, opposite anchoring tabs 37, 37a may be deformed or displaced generally radially inwardly beyond inner circumference 39 of the flux ring, as best seen in FIG. 2, and although the deformation of such opposite anchoring tabs is illustrated herein as defining an acute angle with the inner circumference of the flux ring, it is contemplated that such anchoring tabs may be deformed so as to be generally perpendicular or at an obtuse angle with respect to the inner circumference of the flux ring within the scope of the invention so as to meet at least some of the objects thereof. For example, whatever the angularity of opposite anchoring tabs 37, 37a, it is desirable that they be at least in part embedded in or interconnected with a matrix indicated generally at 51 in FIGS. 4 and 5 and discussed in greater detail hereinafter.

When magnet material elements 29 are mechanically locked in the assembly positions thereof about flux ring 23 and opposite anchoring tabs 37, 37a are deformed, as discussed above, a rotatable member or shaft 53 may be generally coaxially arranged with the flux ring in radially spaced apart relation with inner circumference 39 thereof. Upon this coaxial disposition of flux ring 23 and shaft 53, matrix 51 may be introduced or molded in place in supporting relation or interconnecting engagement between the flux ring and the shaft. As best seen in FIG. 5, matrix 51 may be molded into a configuration within flux ring 23 having a hub or generally central axial section 55 encompassing a part of shaft 53 in gripping engagement therewith and a set of integral spokes or arm sections 57 extending generally radially between the hub and inner circumference 39 of the flux ring and generally the entire axial length thereof so as to define means for receiving at least part of deformed opposite anchoring tabs 37, 37a in embedded relation or interconnecting engagement therein, respectively. It may be noted that the provision of voids in matrix 51 generally between arms or arm sections 57 and between hub 55 and inner circumference 39 of flux ring 23 not only conserves the amount of the material utilized in the matrix but also serves to lighten rotatable assembly 21; however, it is contemplated that the matrix may generally fill at least the volume between shaft 53 and the flux ring within the scope of the invention so as to meet at least some of the objects thereof.

With reference again to the drawings in general and recapitulating at least in part with respect to the foregoing, rotatable assembly 21 is shown having flux ring 23 with magnet material elements 29 associated in their assembly positions generally about outer circumference 33 of the flux ring, respectively (FIG. 3). Flux ring 23 includes a set of generally opposite deformed means, such as opposite locking tabs 35, 35a or the like for instance, for gripping or abutting engagement with confronting parts on magnet material elements 29, such as opposite end faces 45, 45a thereof or the like for instance, thereby to at least in part retain the magnet material elements against displacement from the assembly positions thereof, respectively (FIGS. 3 and 4).

Figure 6:
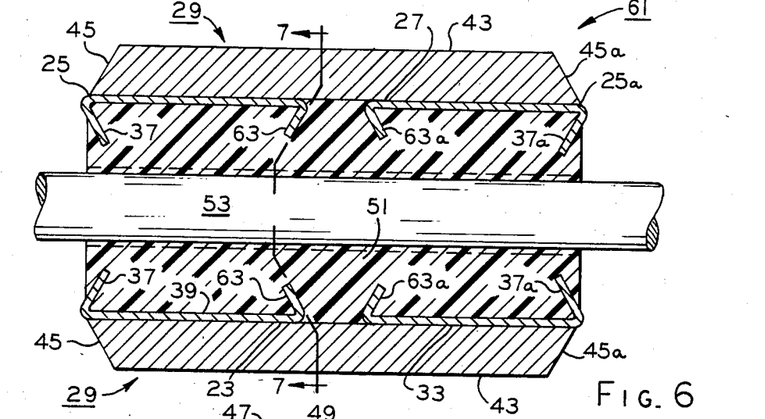
FIG. 6 is a sectional view generally the same as FIG. 4 illustrating an alternative rotatable assembly in one form of the invention and a method of assembling a rotatable assembly with a set of intermediate anchoring tabs deformed from an intermediate portion of the flux ring and embedded in the matrix.
Figure 7:
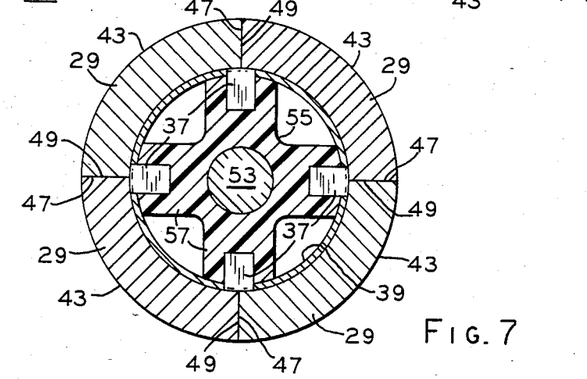
FIG. 7 is a sectional view taken along line 7—7 in FIG. 6.

In FIGS. 6 and 7, there is illustrated an alternative rotatable assembly 61 in one form of the invention and an alternative method of assembling such with alternative rotatable assembly 61 having generally the same component parts and the alternative method having generally the same steps as the previously discussed rotatable assembly 21 and method of assembling such with the exceptions noted hereinafter. While alternative rotatable assembly 61 meets at least some of the objects set out hereinabove, it is believed that such alternative rotatable assembly may have other indigenous objects and advantageous features which will be in part apparent and in part pointed out in the following discussion.

In this alternative method of assembling rotatable assembly 61, another pair of sets of generally opposed intermediate anchoring tabs or flanges 63, 63a are lanced or otherwise formed from intermediate portion 27 of flux ring 23 so as to extend generally radially inwardly therefrom beyond inner circumference 39 of the flux ring, respectively. While intermediate anchoring tabs 63, 63a are shown herein as defining an acute angle with inner circumference 39 of flux ring 23, it is contemplated that such angularity may be generally a right angle or an obtuse angle within the scope of the invention so as to meet at least some of the objects thereof. Thus, when matrix 51 is associated with flux ring 23 and shaft 53, hub 55 generally encompasses the shaft in gripping engagement therewith, as previously described, and integral spokes or arm sections 57 extend generally radially between the hub and inner circumference 39 of the flux ring and generally the entire axial length of the flux ring thereby to receive both opposite anchoring tabs 37, 37a and intermediate anchoring tabs 63, 63a in the embedded or interconnecting engagement with the matrix, as previously mentioned. While both opposite anchoring tabs 37, 37a and intermediate anchoring tabs 63, 63a are illustrated in the anchoring engagement thereof with matrix 51, it is contemplated that opposite anchoring tabs 37, 37a may be omitted from the construction of rotatable assembly 61 within the scope of the invention so as to meet at least some of the objects thereof. Furthermore, while opposite anchoring tabs 63, 63a are shown for purposes of disclosure, it is contemplated that any number of intermediate anchoring tabs may be employed in conjunction with opposite anchoring tabs 37, 37a within the scope of the invention so as to meet at least some of the objects thereof.

In FIGS. 8-11, there is illustrated still another alternative rotatable assembly 71 in one form of the invention and still another alternative method of assembling such an alternative rotatable assembly 71 having generally the same component parts and the alternative method having generally the same steps as the previously discussed rotatable assembly 21 and method of assembling such with the exceptions discussed hereinafter. While alternative rotatable assembly 71 meets at least some of the objects set out hereinabove, it is believed that such alternative rotatable assembly may have indigenous objects and advantageous features which will be in part apparent and in part pointed out in the following discussion.

Figures 8, 9:
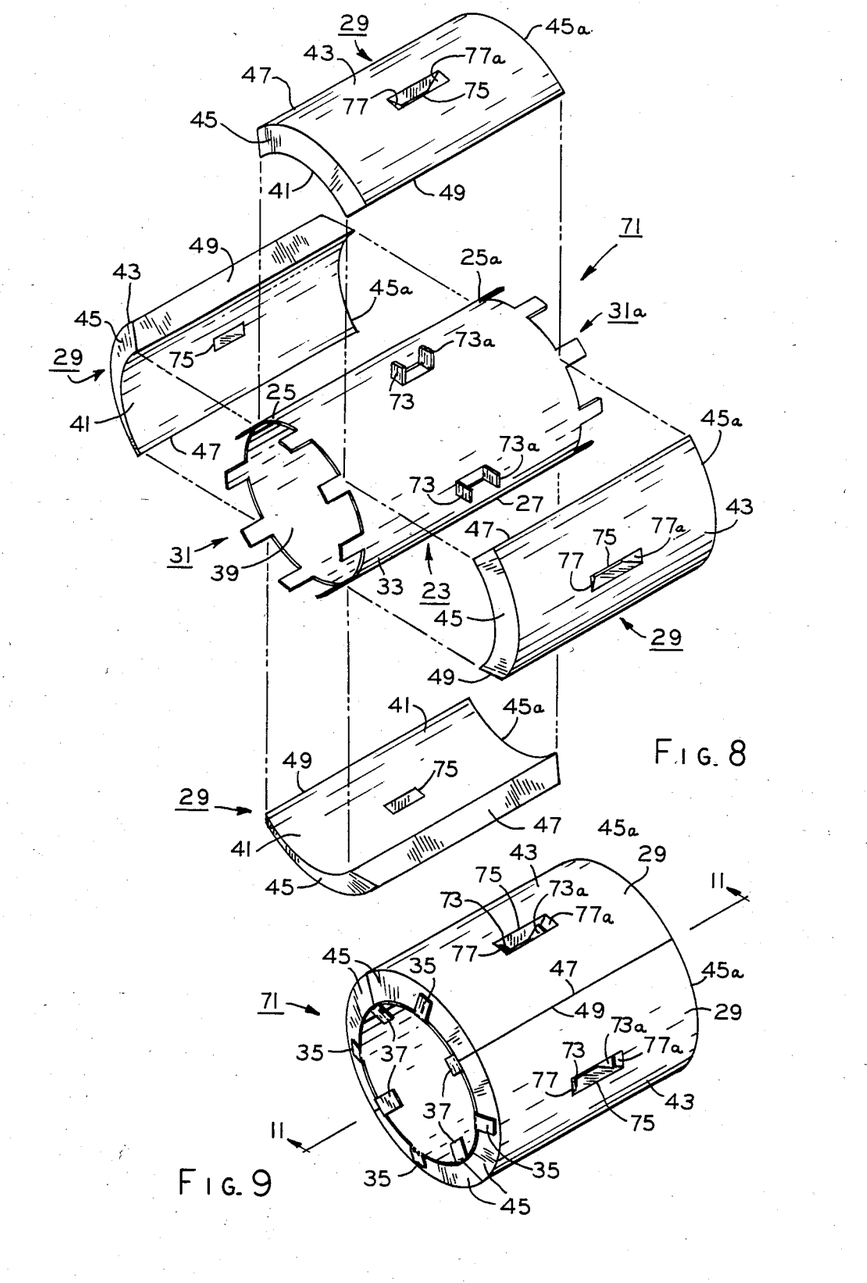
FIG. 8 is an exploded perspective view showing an alternative rotatable assembly in one form of the invention and illustrating principles which may be practiced in an alternative method of assembling a rotatable assembly.
FIG. 9 is a perspective view of the alternative rotatable assembly of FIG. 8 showing the magnet material elements secured in their assembly positions about the flux ring, respectively.
Figure 10:
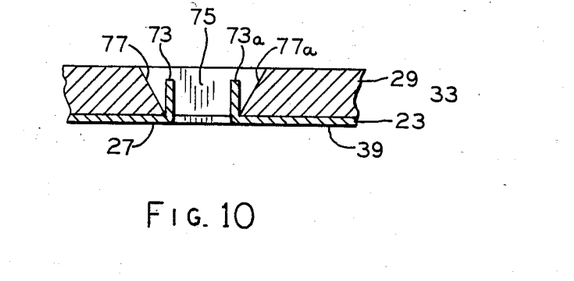
FIG. 10 is an enlarged partial sectional view of the alternative rotatable assembly of FIG. 9 showing the reception of one of the intermediate locking tabs within an opening provided through one of the magnet material elements when in its assembly position.
Figure 11:
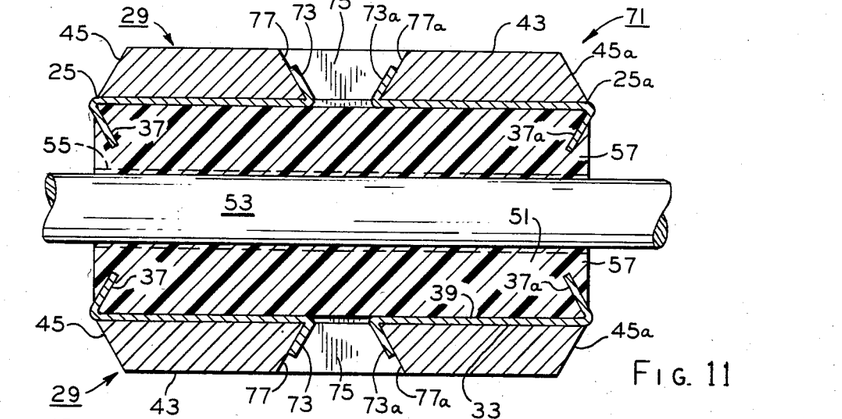
FIG. 11 is a sectional view taken along line 11—11 in FIG. 9 and additionally showing the matrix between at least parts of the flux ring and the shaft.

In this alternative method of assembling rotatable assembly 71, sets of pairs of opposed intermediate locking tabs or flanges 73, 73a are lanced or otherwise formed from intermediate portion 27 of flux ring 23 upon the formation thereof generally in the same manner as opposite tabs 21, 21a, as previously discussed; however, when so lanced, the intermediate locking tabs are extended generally radially outwardly beyond outer circumference 33 of the flux ring, as best see in FIGS. 8 and 10. Magnet material elements 29 are provided with a set of openings 75 which extend generally radially therethrough intersecting with arcuate inner and outer surfaces 41, 43 of the magnet material elements, and the openings include a pair of generally opposed beveled sides or surfaces 77, 77a diverging generally at acute angles from the arcuate inner surfaces toward the arcuate outer surfaces of the magnet material elements, respectively. Thus, when magnet material elements 29 are moved toward their assembly positions disposing arcuate inner surfaces 41 thereof at least adjacent outer circumferencw 33 of flux ring 23, as previously mentioned, openings 75 in the magnet material elements are passed about intermediate locking tabs 73, 73a which are received within the openings generally in spaced apart facing relation with opposed divergent surfaces 77, 77a thereof, respectively, as shown in FIG. 10. With magnet material elements 29 so located in their assembly positions about flux ring 23, forces may be applied or exerted on intermediate locking tabs 73, 73a to effect displacement or bending thereof generally about intermediate portion 27 of the flux ring into gripping or locking engagement with opposed divergent surfaces 77, 77a on the magnet material elements within openings 75 thereof, respectively, as best seen in FIGS. 9 and 11. When so deformed, into abutment with opposed divergent surfaces 77, 77a on magnet material elements 29 within openings 75 thereof, intermediate locking tabs 73, 73a generally define an acute angle with inner circumference 39 of flux ring 23 thereby to exert generally radially inwardly directed forces on the magnet material elements which at least assist in the retention of the magnet material elements against displacement from their assembly positions about the flux ring, respectively. Of course, the deformation of intermediate locking tabs 73, 73a may occur either before, after or generally simultaneous with the deformation of opposite locking tabs 35, 35a of flux ring 13 into locking engagement with opposite end faces 45, 45a of magnet material elements 29 or the deformation of opposite anchoring tabs 37, 37a generally radially inwardly beyond inner circumference 39 of the flux ring, respectively, as previously discussed. Subsequent to the deformation of opposite locking tabs 35, 35a, opposite anchoring tabs 37, 37a and intermediate locking tabs 73, 73a, flux ring 23 may be coaxially arranged with shaft 53, and matrix 51 may be introduced or molded in its supporting relation therebetween. When matrix 51 is molded between flux ring 23 and shaft 53, hub 55 is formed in the gripping engagement thereof about the shaft, and opposite anchoring tabs 37, 37a are received in the embedded relation thereof in opposite arms 57, 57a of the matrix, as previously discussed. Albeit not shown for purposes of drawing simplification, it is contemplated that a different number of intermediate tabs may be lanced from intermediate portion 27 of flux ring 23 and associated in locking engagement with a corresponding number of divergent surfaces within openings 75 through magnet material elements 29, respectively, within the scope of the invention so as to meet at least some of the objects thereof.

Figure 12:
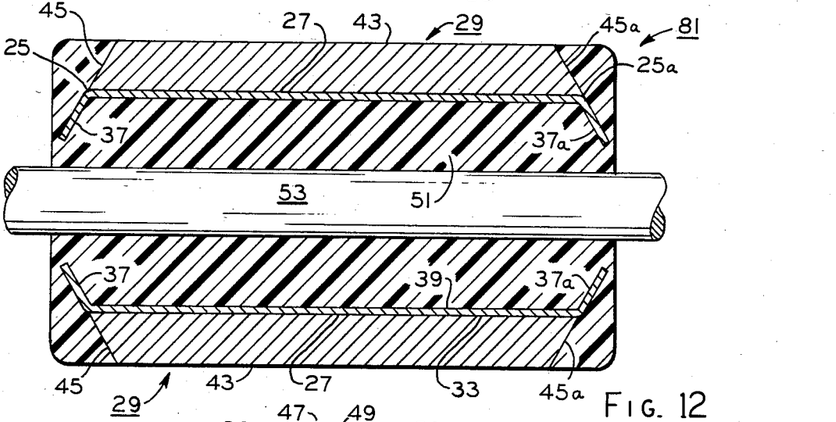
FIG. 12 is a sectional view of another alternative rotatable assembly in one form of the invention and illustrating principles which may be practiced in another alternative method of assembling a rotatable assembly.
Figure 13:
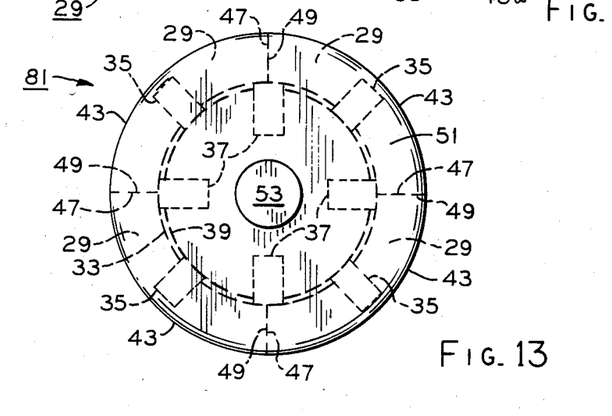
FIG. 13 is a left end view of the alternative rotatable assembly of FIG. 12.

In FIGS. 12 and 13 there is illustrated yet another alternative rotatable assembly 81 in one form of the invention; and yet another alternative method of assembling such with alternative rotatable assembly 81 having generally the same component parts and the alternative method having generally the same steps as the previously discussed rotatable assembly 21 and method of assembling such with the exceptions discussed hereinafter. While alternative rotatable assembly 81 meets at least some of the objects set out hereinbefore, it is believed that such alternative rotatable assembly may have indigenous objects and advantageous features which will be in part apparent and in part pointed out in the following discussion.

In this alternative method of assembling rotatable assembly 81, opposite anchoring tabs 37, 37a are provided so as to form a generally obtuse angle with inner circumference 39 of flux ring 23. When flux ring 23 with magnet material elements 29 locked in their assembly positions thereon is coaxially associated with shaft 53 and matrix 51 introduced therebetween, as previously discussed, it may be noted that the matrix fills generally the entire volume between the flux ring and the shaft. Further, it may also be noted that matrix 51 extends generally radially outwardly of shaft 53 so as to encapsulate generally the entire opposite ends of rotatable assembly 81 including opposite end faces 45, 45a on magnet material elements 29 and opposite locking tabs 35, 35a deformed into locking engagement therewith and opposite anchoring tabs 37, 37a, respectively.

While the encapsulation by matrix 51 of the opposite ends of rotatable assembly 81 is discussed above specifically with respect thereto, it is contemplated that such encapsulating construction of the matrix may be employed with respect to the other rotatable assemblies 21, 61, 71 disclosed herein within the scope of the invention so as to meet at least some of the objects thereof. Furthermore, while voids are illustrated herein in matrix 51 of rotatable assemblies 21, 61, 71 for purposes of disclosure, it is contemplated that the matrix utilized in such rotatable assemblies may fill generally the entire volume between flux ring 23 and shaft 53 thereof, respectively. In addition and albeit not shown for purposes of drawing simplification, it is contemplated that shaft 51 as utilized in rotatable assemblies 21, 61, 71, 81 may be splined, knurled, ridged or grooved to enhance the gripping engagement of matrix 51 with the shaft. While shaft 53 as shown herein with respect to rotatable assemblies 21, 61, 71, 81 is formed of a metal, such as steel or the like for instance, it is contemplated that such shaft may be formed of any suitable material having sufficient mechanical strength for a particular application, and even may comprise the same material as used in molded matrix 51, within the scope of the invention so as to meet at least some of the objects thereof. In addition to the foregoing, it is also contemplated that magnet material elements 29 may be adhered or bonded to outer circumference 33 of flux ring 23 of rotatable assemblies 21, 61, 71, 81 by the use of a suitable adhesive material as well known to the art thereby to assist in the retention of the magnet material elements against displacement from their assembly positions within the scope of the invention so as to meet at least some of the objects thereof. Further with respect to rotatable assemblies 21, 61, 71, 81, it is contemplated that magnet material elements 29 may be permanently magnetized either before or after they are associated in their assembly relation with flux ring 23 of such rotatable assemblies, and as illustrated in FIG. 3 for purposes of disclosure, it is also contemplated that the magnet material elements may be magnetized for example so that north and south poles thereof are alternatively disposed adjacent arcuate outer surfaces 43 of the magnet material elements with corresponding south and north poles being disposed adjacent arcuate inner surfaces 41 of the magnet material elements, respectively, within the scope of the invention so as to meet at least some of the objects thereof.

From the foregoing, it is now apparent that novel rotatable assemblies 21, 61, 71, 81 have been presented meeting the objects set out hereinbefore, as well as others, and that changes in the arrangement, shapes, details and connections of the components of such rotatable assemblies may be made by those having ordinary skill in the art without departing from either the spirit of the invention or the scope thereof as set out in the claims which follow.

What I claim as new and desire to secure by Letters Patent of the United States is:

1. A molded rotor assembly comprising:
   an annular flux ring defining a medium of distribution for magnetic flux;
   a plurality of arcuate permanent magnets circumferentially fastened to the outer surface of said ring and situated adjacent to each other so that the outer surfaces of said magnets generally form the shape of a cylinder, and said magnets being substantially concentrically arranged with respect to the central axis of said ring;
   a first plurality of locking tabs circumferentially disposed at one axial end of said ring and a second plurality of locking tabs circumferentially disposed at the opposite axial end thereof, each of said first and second locking tabs extending generally outwardly from said ring and forming an integral part thereof, and said first and second locking tabs being configured to exert generally radially inwardly directed forces upon the opposite axial ends of said magnets so that each of said magnets is mechanically locked to said ring by at least one of said first and second locking tabs, respectively;
   an axial shaft extending generally coaxially with the control axis of said ring; and
   a molded matrix disposed at least in part between said shaft and said ring.

2. A rotatable assembly for a dynamoelectric machine comprising:
   a generally annular cylindric flux ring including a pair of opposite end portions with an intermediate portion interposed therebetween, respectively;
   a set of magnet material elements disposed in assembly positions on said flux ring, said magnet material elements including generally arcuate inner and outer surfaces extending generally between opposite end portions of said flux ring and with said inner surfaces disposed at least adjacent the outer circumference of said flux ring, a pair of opposite end faces interposed between said inner and outer surfaces and arranged at least adjacent said opposite end portions of said flux ring, and an opening extending between said inner and outer surfaces, respectively;
   said flux ring further including a pair of sets of opposite tabs integral with said opposite end portions on said flux ring, some of said opposite tabs extending from said opposite end portions of said flux ring generally outwardly beyond the outer circumference thereof into gripping engagement with said opposite end faces of said magnet material elements to effect at least in part the retention of said magnet material elements against displacement from the assembly positions thereof on said flux ring, others of said opposite tabs extending from said opposite end portions of said flux ring generally inwardly beyond the inner circumference thereof, and at least a set of intermediate tabs integral with said intermediate portion of said flux ring and extending therefrom beyond the outer circumference thereof into gripping engagement with confronting parts on said magnet material elements within said openings between said inner and outer surfaces of said magnet material elements thereby to assist in the retention of said magnet material elements against displacement from the assembly positions thereof on said flux ring, respectively;
   a shaft arranged generally in coaxial relation with said flux ring and extending at least in part therethrough; and
   a matrix disposed in supporting relation between at least parts of said flux ring and said shaft and receiving said others of said opposite tabs at least in part in interlocking engagement, respectively.

3. A rotatable assembly for a dynamoelectric machine comprising:
   a generally annular cylindric flux ring including a pair of opposite end portions with an intermediate portion interposed therebetween, respectively;
   a set of generally arcuate magnet material elements associated in assembly positions with said flux ring generally about the outer circumference thereof, said magnet material elements including an opening therethrough, and a pair of opposite end faces disposed at least adjacent said opposite end portions on said flux ring, respectively; and
   said flux ring further including a pair of sets of opposite tabs on said opposite end portions of said flux ring with at least some of said opposite tabs being deformed into engagement with said opposite end faces of said magnet material elements thereby to at least in part effect the retention of said magnet material elements against displacement from the assembly positions thereof on said flux ring, and at least a set of intermediate tabs on said intermediate portion of said flux ring extending into said openings in said magnet material elements and deformed into engagement with confronting parts of said magnet material elements within said openings to assist in the retention of said magnet material elements against displacement from the assembly positions thereof on said flux ring, respectively.

4. A rotatable assembly for a dynamoelectric machine comprising:

a generally annular cylindric flux ring including a pair of opposite end portions with an intermediate portion interposed therebetween, respectively;

a set of magnet material elements disposed in assembly positions on said flux ring, said magnet material elements including generally arcuate inner and outer surfaces extending generally between said opposite end portions of said flux ring and with said inner surface disposed at least adjacent the outer circumference of said flux ring, and a pair of opposite end faces interposed between said inner and outer surfaces and arranged at least adjacent said opposite end portions of said flux ring, respectively;

said flux ring further including a pair of sets of opposite tabs integral with said opposite end portions of said flux ring, some of said opposite tabs extending from said opposite end portions of said flux ring generally outwardly beyond the outer circumference thereof into gripping engagement with said opposite end faces on said magnet material elements thereby to at least in part effect the retention of said magnet material elements against displacement from the assembly positions thereof on said flux ring, and others of said opposite tabs extending from said opposite end portions of said flux ring generally inwardly with respect to the inner circumference of said flux ring, respectively;

a shaft arranged generally in coaxial radially spaced relation with said flux ring and extending at least in part therethrough; and a matrix extending in supporting relation between at least parts of said flux ring and said shaft and receiving said others of said opposite tabs at least in part in embedded interlocking engagement, respectively.

5. A rotatable assembly for a dynamoelectric machine comprising:

a generally annular cylindric flux ring including a pair of opposite end portions with an intermediate portion interposed therebetween, respectively;

a set of generally arcuate magnet material elements disposed in assembly positions generally about the outer circumference of said flux ring and including a pair of opposite end faces arranged at least adjacent said opposite end portions of said flux ring, respectively;

said flux ring further including a pair of sets of opposite tabs on said opposite end portions, some of opposite tabs extending generally beyond the outer circumference of said flux ring into gripping engagement with said opposite end faces of said magnet material elements thereby to at least in part effect the retention of said magnet material elements against displacement from the assembly position thereof and others of said tabs extending generally inwardly with respect to the inner circumference of said flux ring, respectively;

a shaft associated generally in coaxially spaced relation with said flux ring; and a matrix engaged between at least parts of said flux ring and said shaft and receiving said others of said opposite tabs at least in part in interlocking engagement, respectively.

6. A rotatable assembly as set forth in claim 5 further comprising means for bonding the magnet material elements in the assembly positions thereof about the outer circumference of said flux ring, respectively.

7. A molded rotor assembly as set forth in claim 1 wherein said ring further includes a first plurality of anchoring tabs circumferentially disposed at said one opposite axial end of said ring, and a second plurality of anchoring tabs circumferentially disposed at said other opposite axial end of said ring, said first and second anchoring tabs extending generally radially inwardly with respect to said ring and being embedded at least in part in anchoring engagement in said molded matrix, respectively.

8. A molded rotor assembly as set forth in claim 1 wherein at least one of said first and second anchoring tabs extend from said ring so as to form a generally acute angle therewith, respectively.

9. A molded rotor assembly as set forth in claim 1 wherein at least one of said first and second anchoring tabs extend from said ring so as to define a generally obtuse angle therewith, respectively.

10. A molded rotor assembly as set forth in claim 1 wherein said magnets include a plurality of openings therein, respectively, and said ring further including a plurality of intermediate locking tabs disposed between said first and second locking tabs and extending generally beyond said outer surface of said ring into said openings, said intermediate locking tabs being configured to exert generally radially inwardly directed forces upon other confronting parts of said magnets within said openings thereby to assist in the mechanical locking of said magnets to said ring, respectively.

11. A molded rotor assembly as set forth in claim 1 wherein said matrix includes a hub portion disposed about a part of said shaft in gripping engagement therewith, and a plurality of arm sections integral with said hub portion and extending therefrom into engagement with said ring, respectively.

12. A rotatable assembly as set forth in claim 2 further comprising an adhesive material interposed at least in part between said intermediate portion of said flux ring and said inner surfaces of said magnet material elements thereby to assist in the retention of said magnet material elements against displacement from said flux ring, respectively.

13. A rotatable assembly as set forth in claim 2 wherein said matrix includes a hub portion disposed about said part of said shaft, and a plurality of arm sections extending from said hub portion into abutment with said intermediate portion of said flux ring, at least some of said arm sections receiving said others of said opposite tabs at least in part in the locking engagement, respectively.

14. A rotatable assembly as set forth in claim 2 wherein at least some of said others of said opposite tabs extend from said opposite end portions of said flux ring so as to define a generally acute angle therewith, respectively.

15. A rotatable assembly as set forth in claim 2 wherein at least some of said others of said opposite tabs extend from said opposite end portions of said flux ring so as to define a generally obtuse angle therewith, respectively.

16. A rotatable assembly as set forth in claim 2 wherein each intermediate tab set comprises an opposed pair of said intermediate tabs.

17. A rotatable assembly as set forth in claim 3 wherein said at least some opposite tabs and said intermediate tabs extend from said flux ring so as to form a generally acute angle therewith and thereby exert a generally radially inwardly directed force on said magnet material elements to assist in the retention of said magnet material elements against displacement from the assembly positions thereof on said flux ring, respectively.

18. A rotatable assembly as set forth in claim 3 further comprising an adhesive material interposed between said intermediate portion of said flux ring and said magnet material elements to at least assist in the retention of said magnet material elements against displacement from the assembly positions thereof on said flux ring, respectively.

19. A rotatable assembly as set forth in claim 3 wherein each intermediate tab set includes an opposed pair of said intermediate tabs.

20. A rotatable assembly as set forth in claim 3 further comprising a shaft associated with said flux ring, a matrix interposed between a pair of said shaft and at least parts of said intermediate portion of said flux ring, and others of said opposite tabs being deformed so as to be received at least in part in said matrix in locking engagement therewith, respectively.

21. A rotatable assembly as set forth in claim 20 wherein said matrix includes a hub disposed about said shaft part, and a set of arm sections integral with said hub and extending therefrom into abutment with said at least parts of said intermediate portions of said flux ring, said others of said opposite tabs being received at least in part in said arm sections, respectively.

22. A rotatable assembly as set forth in claim 5 wherein said magnet material elements further include a plurality of openings spaced between said opposite end faces and extending through said magnet material elements, respectively, and wherein said flux ring further includes at least a set of intermediate tabs extending from said intermediate portion into said opening and arranged in gripping engagement with confronting parts on said magnet material elements within said openings thereby to assist in the retention of said magnet material elements against displacement from the assembly positions thereof on said flux ring, respectively.

23. A rotatable assembly as set forth in claim 22 wherein each intermediate tab set comprises at least an opposed pair of said intermediate tabs.

24. A rotatable assembly as set forth in claim 5 wherein said flux ring further includes a set of intermediate tabs extending from said intermediate portion and being received at least in part in embedded locking engagement with said matrix, respectively.

25. A rotatable assembly as set forth in claim 5 wherein said matrix includes a hub portion arranged about said shaft, and a plurality of arm sections interposed between said hub portion and said intermediate portion of said flux ring, said others of said opposite tabs being received at least in part in the interlocking engagement with said arm sections, respectively.

26. A rotatable assembly as set forth in claim 25 wherein said flux ring further includes a set of intermediate tabs extending from said intermediate portion and being received at least in part in interlocking engagement with said arm sections, respectively.

27. A rotatable assembly as set forth in claim 5 further comprising means for bonding said magnet material elements in the assembly positions thereof thereby to assist in the retention of said magnet material elements against displacement from said flux ring, respectively.

* * * * *